United States Patent [19]

Jones et al.

[11] 4,214,271
[45] Jul. 22, 1980

[54] TECHNIQUE FOR DC RESTORATION IN AC COUPLED DISPLAY SYSTEMS

[75] Inventors: George R. Jones, Greenbelt, Md.; Peter K. Raimondi, Woodbridge, Va.

[73] Assignee: The United States of America as represented by the Secretary of the Army, Washington, D.C.

[21] Appl. No.: 12,784

[22] Filed: Feb. 16, 1979

Related U.S. Application Data

[63] Continuation-in-part of Ser. No. 821,371, Aug. 3, 1977, abandoned.

[51] Int. Cl.² ............................ H04N 5/16; H04N 5/33
[52] U.S. Cl. ..................................... 358/166; 358/171; 358/113
[58] Field of Search ................ 358/113, 166, 168, 171, 358/110, 111, 167, 37; 343/5 DP, 5 VQ, 6 TV; 250/333, 334, 347, 348

[56] References Cited

U.S. PATENT DOCUMENTS

| 3,979,555 | 9/1976 | Opittek et al. ..................... 358/166 |
| 3,983,320 | 9/1976 | Ketcham et al. .................... 358/166 |

*Primary Examiner*—John C. Martin
*Attorney, Agent, or Firm*—Nathan Edelberg; Robert P. Gibson; Max L. Harwell

[57] ABSTRACT

A technique for DC restoration in AC coupled display systems which includes histogramming, more specifically calculation of histogram values, of the difference in gray levels between two adjacent picture lines on a picture element by picture element (PIXEL-by-PIXEL) basis. The gray level obtaining the maximum number of occurrences is considered the mode of the histogram values. This mode used as an addition factor to every PIXEL of one of the lines, to add a predominating background level or DC component thereto, which is used to create the difference of gray levels between the next two adjacent picture lines. This addition sequence is carried on throughout the entire image frame.

6 Claims, 7 Drawing Figures

TECHNIQUE FOR DC RESTORATION IN AC COUPLED DISPLAY SYSTEMS

The invention described herein may be manufactured, used and licensed by the U.S. Government for governmental purposes without the payment of any royalties thereon.

CROSS-REFERENCE TO RELATED APPLICATION

This application is a continuation-in-part of previously filed application, Ser. No. 821,371, filed Aug. 3, 1977, by the same inventors as this application, and entitled "METHOD OF PSEUDO DC RESTORATION BY SYNTHETIC MEANS IN DISPLAY SYSTEMS", now abandoned.

BACKGRUND OF THE INVENTION

The area of technology of the present invention is involved in AC coupled display systems and specifically to infrared detectors, scanners, and infrared viewing systems. The application of DC restoration is needed in viewing systems where the sensors, or the detector array, and the amplifying electronics are separated by coupling capacitors.

All AC coupled display systems, especially infrared systems that have input sensors which are affected by large transitions in input levels, need some form of DC restoration to faithfully and uniformly reproduce the actual intensity level distributions from the original scene. Assume a gray level scale of 0 representing black to 63 representing white, any detector that scans objects with intensities near black, i.e., gray level 0, can faithfully reproduce them until that sensor sees an object with intensity near gray level 63, or white. Since this "hot" object, represented by white, causes a dramatic shift in detector output signal level on all items within that particular scene which are gray are lost to total blackness. In simpler terms, once a detector sees a pure white object all other objects appear black as compared to that white intensity level.

The primary technical cause for this DC restoration problem is the capacitor network that performs low frequency or background subtraction (AC coupling - DC blocking) and is positioned between the detectors and the preamplifiers of the infrared viewing systems. After the sensor looks at the white object, the capacitor discharges to the preamplifier which causes DC droop and undershoot and requires time for the capacitor to recharge, where time to recharge may last through several scan lines.

Previously, DC restoration was performed by some mechanical technique, such as a means whereby at the end of every scan line the detector is forced to look at a temperature reference and the corresponding detector level is adjusted to faithfully reproduce that temperature. Two problems were solved by this mechanical technique. Firstly, the problem of undershoot is compensated for after each scan line since now the detector channel is forced to adjust to produce an accurate reproduction of the temperature reference. Secondly, in systems with multiple detectors, a DC level standard is imposed on all detectors making them equally as accurate at that parricular temperature. However, the process of mechanical temperature referencing has several drawbacks. The first drawback is that of maintaining a highly accurate temperature reference which shows little linear degradation such that in multiple detector scanning systems all detectors are referenced to exactly the same temperature. Other problems arise in the actual placement of the temperature reference within the scanning system.

SUMMARY OF THE INVENTION

The techniques for DC restoration of the present invention rely on the application of mathematical algorithms on the preamplified detector signals. These techniques may be implemented using hardware means such as: charge transfer devices, microprocessors, and discrete components. The present technique for DC restoration involves the use of the calculated histogram values for the difference in gray levels in at least two adjacent scan lines and determining and adding the mode of the histogram and applying this mode to adjacent scan lines. The histograms can be implemented by either analog or digital hardware. Each of the techniques may be implemented in real time with the storage of only one or two scan lines, and not the storage of an entire frame. Using the present techniques, there will be no need of additional hardware for temperature referencing or overscanning.

DESCRIPTION OF THE DRAWINGS

FIG. 4 illustrates a flow-chart of the calculation of histograms to determine and add their mode; and FIG. 5 shows a curve that illustrates the histogram and the mode of the differences of that histogram that is established by the maximum number of gray level occurrences.

DETAILED DESCRIPTION OF THE PREFERRED EMBODIMENT

Figure 1:
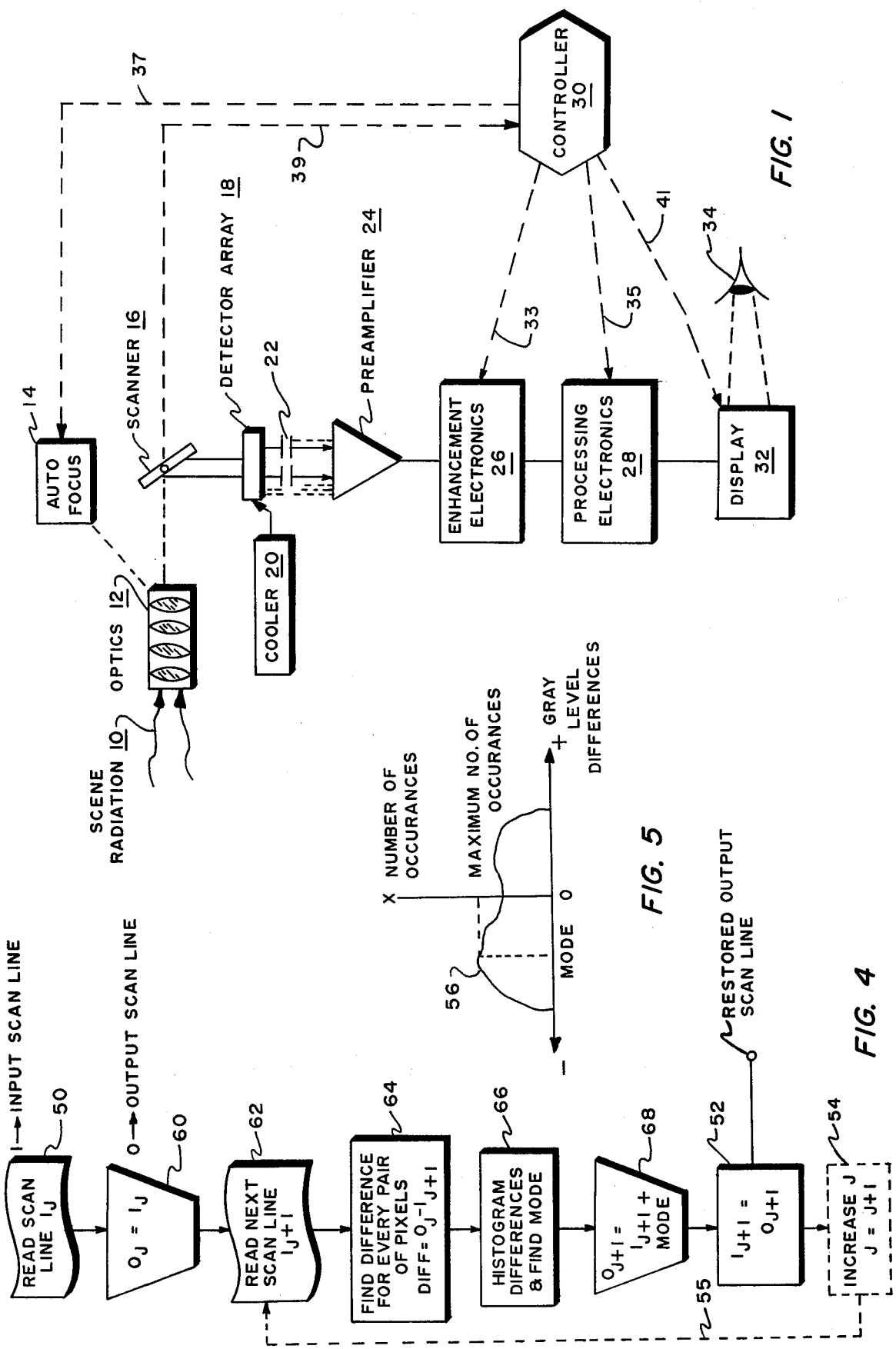
FIG. 1 is a schematic block diagram, generally illustrating the components of a typical AC coupled display system.

Referring to FIG. 1 that shows the schematic block diagram of a typical AC coupled display system, herein referred to as infrared viewing system, the present technique of DC restoration by calculation of the mode of the histogram values of the gray level differences will be better understood. The problem of DC restoration occurs because of sudden changes of intensity of a scene input signal or scene radiation image 10 that is scanned across the detector array 18 by a scanning means. The scanning means may compromise a bank of in-line optics 12, which focuses scene radiation image 10 on a scanner mirror 16 that in turn reflects the scene radiation on detector array 18. An autofocus 14 may be used to move the various optical elements of optical 12, and the scanner mirror 16 itself. Scanner mirror 16 may have an angle transducer (not shown) thereon which has a transducer output signal picked off therefrom that is applied to a controller 30 as indicated by dashed line lead 39, in which the transducer output signal provides synchronizing timing and clockpulse timer signals for the entire system, indicated by dashed line leads 33, 35, and 41, to assure a real time visual image on a display device 32. The sudden changes in the generated detector output signals from the detector array 18, caused by the sudden changes of intensity of the scene input signal after each of the detectors in the detector array 18 look at a white intensity object, cause the capacitors 22 in the capacitor network to discharge to a plurality of preamplifiers 24. Since the capacitors perform low frequency or background subtraction of the detector output voltages prior to application to the input of the preamplifiers 24, the discharge of the capacitors causes DC droop and undershoot that may require several scan lines for the capacitors to recharge back to their value before the white light was viewed. The input voltage signals from these scan lines to the preamplifiers 24 may thus last through several scan lines of the scene radiation 10 over the detector array 18. Therefore, during DC droop and undershoot, resolution of the scene or of portions thereof would be lost on display 32, as viewed by an observer represented by number 34.

The present inventive DC restoration means comprises a DC restorer circuit having means that rely on the application of mathemathical algorithms on the preamplified detector output signals from 24 that are fed into an enhancement electronic means 26. The DC restorer circuit comprises only a portion of the enhancement electronics 26. The techniques may be implemented through several hardware functions, three of which could be (1) charge transfer devices (CCDs) used for analog or digital processing, (2) microprocessors used for digitally processing of an internally programmed schedule for the calculation of the histogram values, and (3) by the use of discrete components. All of these methods involve the calculation of histogram values, but not the construction of an actual histogram. Each of the techniques may also be implemented in real time with the storage of only one or two scan lines, and not the storage of an entire frame. The DC restoration technique of this invention eliminates the need for the undesirable addition of hardware for temperature reference for over scanning. The detector array 18, preamplifier 24, and enhancement electronics 26 may all be conveniently positioned on one silicon substrate of the focal plane of the scanning system. The enhancement electronics 26 generally has functions other than calculating histogram values to find the mode of the differences in gray levels and adding their mode of differences for DC restoration. Some of these functions could be contrast enhancement, automatic cueing, resolution restoration, etc, but such functions are not pertinent to the present invention. The processing electronics means, indicated by block 28, processes the preamplified detector output signals from the enhancement electronics 26 to provide a visual image of the scene input signal 10. The processing electronics may process the already DC restored signals into a visual image by forcing the restored, or corrected, signal levels to within the TV range by the use of TV converter means and amplifiers. Display 32 may be a TV type display.

Figure 2:
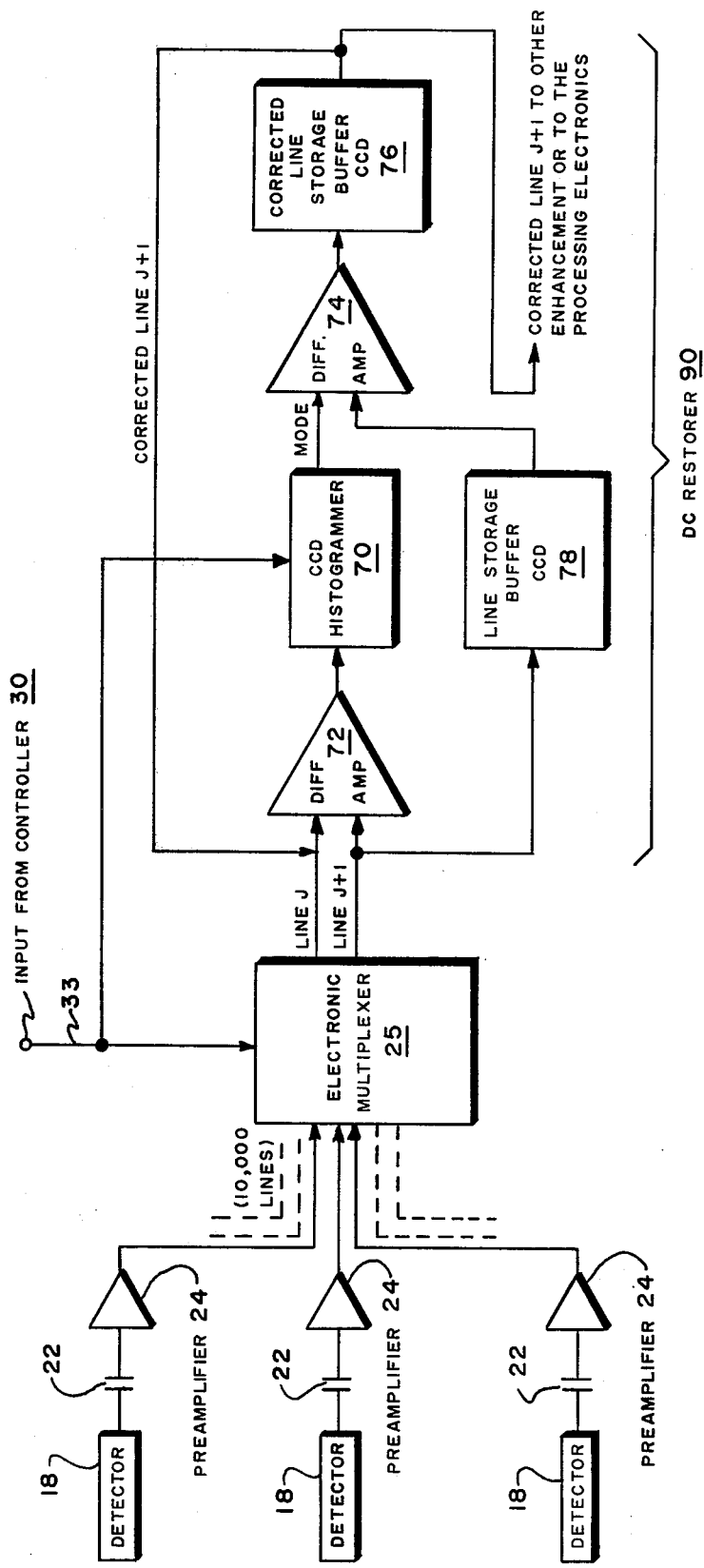
FIG. 2 shows in block diagram the analog hardware for a typical implementation of the present invention.
Figure 3A:
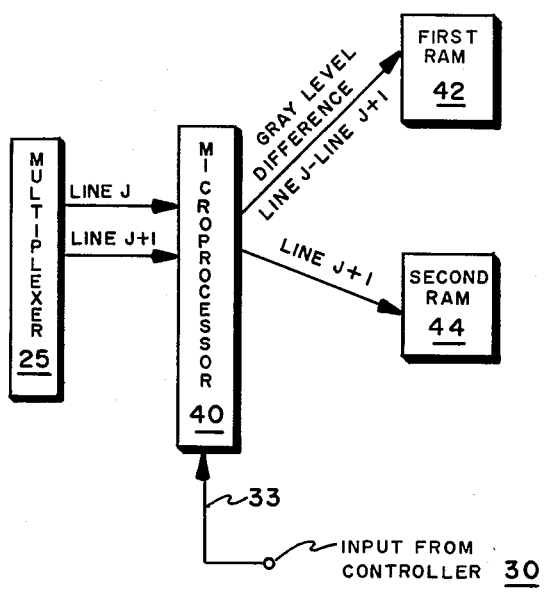
FIGS. 3A, 3B, and 3C illustrate progressive phases of digital hardware implementation of the histogram value calculation by use of microprocessors of the present invention.
Figure 3B:
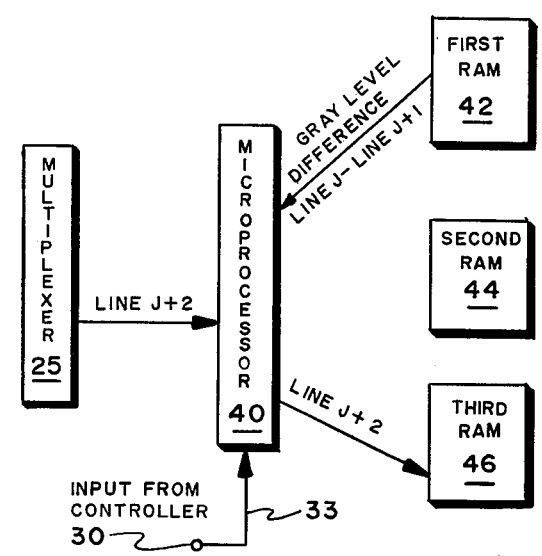
Figure 3C:
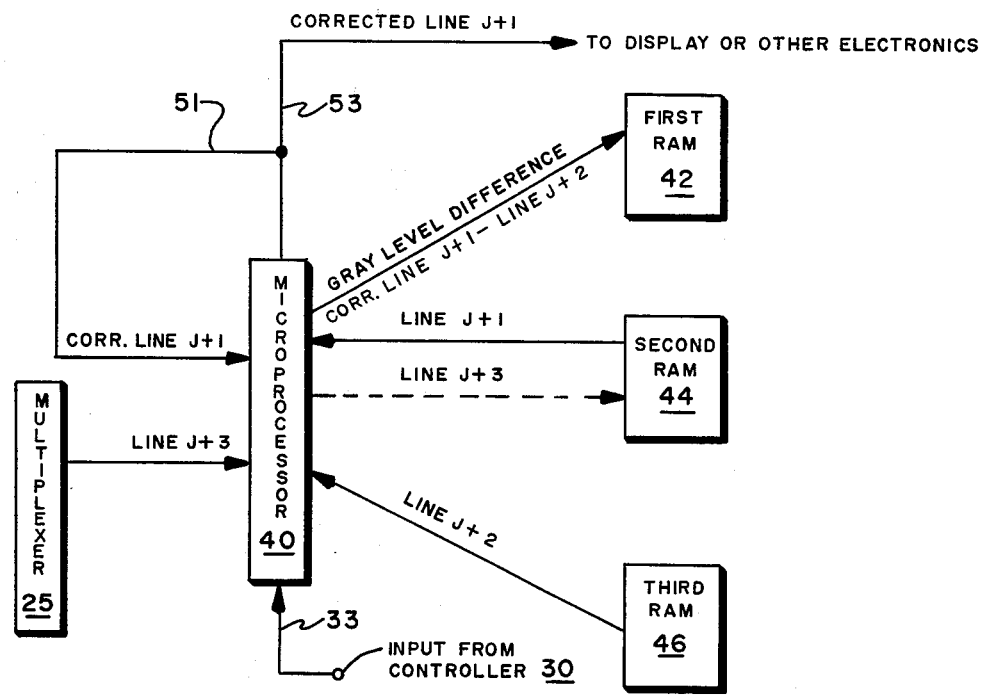

FIG. 4 shows a flow-chart that illustrates the calculation of the histogram values of the present invention. FIG. 2 shows one means and FIGS. 3A, 3B, and 3C illustrate another means of implementing the present technique of calculating the histogram values to form a mode of the differences and are explained later in this application. The DC restoration mathematical algorithm involves continuous calculation of the histogram values between two adjacent scan lines and possibly throughout all the scan lines. Specifically, the algorithm takes PIXEL-by-PIXEL difference between two adjacent lines as shown by block 64, and calculates the histogram values for these differences and finds the mode of a differences, as indicated in block 66. CCD devices may be used to subtract the difference $O_J - 1_{J+1}$, indicated in block 64, and may calculate a histogram of their differences and add. Also, the CCD device may act as a picture line delay/storage for certain input and output scan lines $1_J$ or $O_J$, as represented by numerals 50 and 60. The mode of the difference is represented by the maximum number of occurences of the gray level differences between adjacent scan lines and is indicated by the maximum amplitude of curve 56 in FIG. 5. Numerals 50 and 60 illustrate respectively the scan of one input scan line, represented by $I_J$, and the scan of one output scan line, represented as $O_J$, wherein the input and output lines are the same. Numeral 62 represents the function of reading the next input scan line of $I_J+1$ upon instruction from block 54, by reference line input along dashed line 55 which is derived from the pattern in the flow chart of increasing the originally scanned $I_J$ line to that of the subsequent line $I_J+1$, into 62 on a PIXEL-by-PIXEL basis along with reading in the last scan line, represented as $O_J$, on a PIXEL-by-PIXEL basis. The operation in block 64 finds the differences between each of the pairs of PIXELs by parallel operation of the differential amplifier 72 in FIG. 2, or microprocessor devices 40 in FIGS. 3A, 3B, and 3C.

The output from block 68, represented by $O_J+1$, is equal to the second scanned line $1_J+1$ plus the mode of the difference between the first output $O_J$ and the second scanned line $1_J+1$. The output from block 68 is applied to a reference line storage, indicated by block 52, which has the restored output scan line to be displayed as an output therefrom, and is used as the reference line input for the next differencing process, as an input to 62 shown by dashed line 55. Also, the scan line counter 54 has an input from block 52 that is increased by 1. The only unrestored, or uncorrected, line in an entire frame is the first line of the sequence, or in this illustration line $1_J$. The output line to the scan line counter 54 from the reference line strorage 52 is the reference for the next line to be restored.

Another similar algorithm for pseudo DC restoration may use the difference of the modes, rather than the mode of the differences. The difference of the modes represents first finding the mode on a PIXEL-to-PIXEL basis in each line and then subtracting the established modes of adjacent lines to keep the background level (or DC restoration) within established limits.

FIG. 2 illustrates in block diagram form the DC restorer circuit block diagram comprised of a charge coupled device analog processing means that continuously calculates the histogram values of the various intensity gray levels emitted from the detectors in the present AC coupled viewing system. A charge coupled device (CCD) histogrammer 70 may be comprised of a CCD charge quantizer, a CCD sorter, and a CCD serpentine delay line that involves the following CCD functions. Controller 30 serves as timer and clock by applying synchronizing clockpulses over lead 33 that synchronously switch the timing gates and charge wells of the CCDs within the CCD histogrammer 70 simultaneously with the switching circuits in multiplexer 25. Intensity differences on a PIXEL-by-PIXEL basis are applied on a line-to-line basis from the differential amplifier 72 into the CCD histogrammer 70. The input lines are applied as an input to the CCD charge quantizer and are injected into a holding well whereupon a transfer gate voltage is clocked to serially transfer charges into a plurality of discrete storage wells. The amount of charge in each discrete storage well is proportional to the amount of charge passed by the transfer gate voltage for each PIXEL and whether the intensity of the PIXEL fits the particular character of the well. The contents of each discrete storage well is then parallel shifted into a plurality of corresponding charge channels of the CCD sorter. There are 63 of these plurality of channels in the CCD sorter wherein each of these channels are designed to receive the intensity of all signals, wherein the intensities are from black represented by 0 to white represented by 63 as mentioned herein above. In other words, the sample charges in the 63 wells are by the CCD sorter and these weighted charges implement the caluclation of the histogram values. More specifically, the parallel outputs from the sorter are fed into a focal plane arrangement that has a serpentine delay line for moving the sorted quantized signals, which form the mode, out into an input to differential amplifier 74. The example used with the embodiment of FIG. 2 is that there are 10,000 lines, including a number of PIXELs in each line, that are applied to an electronic multiplexer 25. A detector 18, coupling capacitor 22, and preamplifier 24 represent one of the PIXELs in a line. The multiplexer 25 (which also time delays and integrates) outputs a selected number of the 10,000 adjacent scan lines which are processed by the DC restorer circuit 90. The DC restorer circuit 90 of FIG. 2 involves an analog method of calculating the histogram values of the gray level signals by application of mathematical algorithms on the preamplified detector signals. This method comprises CCD histogram value calculations of adjacent PIXELs on the line-to-line storage basis using a CCD histogrammer 70. The DC restorer circuit 90 is timed by synchronizing clockpulse timer inputs from a controller 30 along lead 33. The timer inputs from the controller 30 gate the CCD voltage in the histogrammer 70 and gate the switching electronic multiplexer 25 in accordance with the position of the angle transducer on the oscillating scanner 16. The controller 30 also sends timing signals to the display 32 so that all of the viewing system from the scanner 16 to the display 34 are synchronized.

Look now more closely at FIG. 2 where the selected numbers of adjacent scan lines are sequentially multiplexed into a first differential amplifier 72. Only two adjacent lines are shown, noted as line J and line J+1, but it should be understood throughout this explanation that all the other selected lines are "operated on" in a similar manner. Line J, which is noted as a starting scan line, is applied to one input of 72 and line J+1, or the first adjacent odd numbered scan line, is applied to another input of 72. Line J+1 is simultaneously stored in a CCD line storage buffer 78. Differential amplifier 72 takes the differences of the signal voltages in these adjacent lines on a PIXEL-by-PIXEL basis. The differences of preamplified detector output signals are fed to a CCD histogrammer 70 which determines the mode of the gray level differences between line J and line J+1. The mode of the differences in gray level—as determined by the maximum number of occurrences of various intensity differences, or in other words the maximum number of occurrences of a particular gray level as established by a gray level of between 0 (zero) representing pure black and 63 representing pure white—is applied as one input of a second differential amplifier 74. Line J+1 that was stored in 78 is applied as a second input of 74. Now the mode of the differences, or the intensity level difference with the largest number of occurrences, will be added to every PIXEL within scanned line J+1. In effect, this adds a predominating background level (DC component) to line J+1, raising its level to make blacks, grays, and to make whites, whiter. The resulting output from 74 is a corrected line J+1 that is stored in a CCD line storage buffer 76 for one line scan prior to the scan line J+2 whereupon corrected line J+1 is applied to other enhancement or processing electronics and back to the input of 72 where line J was applied during the previous scan. Line J+2, which may be designated the first adjacent even numbered scan line, is simultaneously applied to the input where line J+1 was applied. This restoration of a pseudo DC level will enhance minor items, such as the horizon line, as well as further highlight target areas. This algorithm will be applied to every scan line of the remaining scan lines from multiplexer 25 in a single frame with the exception of the original scan line, represented as scan line J. It is possible that differential amplifiers 72 and 74 may be combined into one amplifier and also line storage buffers 76 and 78 may be one unit.

This technique of DC restoration should not be limited to subtracting, or taking the difference, of line J+1 from line J. According to system parameters, another technique could be to take the absolute value of the difference thereby neglecting to consider which line has the larger magnitude. Enhancement by the enhancement electronics 26, of which the DC restorer 90 is only a part thereof, may also be achieved by weighing certain intensity differences more than others. By calculating the histograms for one single line, the same general results may be achieved. Also, by saving the entire DC restored frame and again performing the same algorithm on each line, the target areas may be further enhanced to enable the system to perform automatic target cueing. This algorithm could also prove effective as a method for contrasting enhancement and responsivity equilization and enhancement, as well as data compression.

FIGS. 3A, 3B, and 3C illustrate, in sequence, the operations of a microprocessing digital means comprised of a microprocessor and three random access memories operating as a technique for DC restoring signals on a line-to-line basis, and is the functional equivalent of the DC restorer 90 that was discussed with reference to the CCD analog processing means of FIG. 2. However, instead of being an analog processing technique that relies on the application of mathematical algorithms on the preamplified detector signals as shown in FIG. 2, the microprocessor is used in a digital processing technique that also relies on the application of mathematical algorithms on the preamplified detector signals. The actual digital process may be either built into the microprocessor 40 or programmed therein. Microprocessor 40 comprised a portion of the enhancement electronics 26. Microprocessor 40 may have independent memory address signals and request read or write information on command by an input from controller 30, along lead 33. The microprocessor 40 addresses the random access memories (RAMs) 42, 44, and 46.

Look now more closely at FIGS. 3A, 3B, and 3C for an explanation of the function of the microprocessor in a digital processing technique. The inputs shown on the left side of the microprocessor 40 are derived from multiplexer 25 which may be the same selected number of adjacent scan lines that were multiplexed from multiplexer 25 as discussed in reference to FIG. 2. The three random access memories alternately store and read out the differences of intensity of the various PIXELs on a line-to-line basis from the multiplexer 25, and alternately store and read out the gray level values of the PIXELs on each line from the multiplexer. Specifically, the second RAM 44 stores and reads out the sequential odd numbered scan lines, J+1, J+3, etc, while the third RAM 46 stores and reads out the sequential even numbered scan lines, J+2, J=4, etc. The first RAM 42 stores and reads out the gray level differences between adjacent lines on a PIXEL-by-PIXEL basis.

Look now at FIG. 3A and further assume that the entire viewing system has just been turned on. Scan line J does not mean anything at this time. However, as the scanning process begins, the microprocessor 40 reads inn a starting scan line J and the first adjacent odd numbered line, which is line J+1, from multiplexer 25. The microprocessor calculates histogram values of the gray level difference between these adjacent scan lines J and J+1 on a PIXEL-by-PIXEL basis and then stores these differences in the first RAM 42. The maximum numbers of occurrences of the gray level differences between adjacent scan lines again is the mode of the differences. Simultaneously, line J+1 is read into the second RAM 44 and is stored therein. During the delay time between the completion of the sweep of line J+1 on the detector array 18 by scanner 16 and the beginning of the sweep of the first even numbered scan line J+2, the gray level differences remains stored in the first RAM 42. The line J+1 remains stored in the second RAM 44 during the scanning of line J+2, but is read out by the microprocessor 40 during the scanning of the next sequentially adjacent odd numbered scan line, i.e., line J+3, which will be explained therein below.

FIG. 3B represents the action that takes place during the scanning of the next sequentially adjacent scan line, which is the first even numbered scan line J+2. Line J+2 is read into the microprocessor 40 and is read on into the third RAM 46. Line J+1 remains stored in the second RAM 44. The gray level difference between adjacent scan lines J and J+1 is read out of the first RAM 42 by the microprocessor 40 on a PIXEL-by-PIXEL basis. The mode of the difference between the intensity of PIXELs between lines J and J+1 is found by the microprocessor and is stored therein.

FIG. 3C represents the action during the scanning of the next adjacent odd numbered scan line, which is line J+3. Line J+3 is read into the microprocessor 40 and is read on into the second RAM 44. Simultaneously, line J+1 that has been stored in the second RAM 44 since the scanning thereof is now read out by the microprocessor. Line J+1, from the second RAM 44, is added with the mode of the differences between lines J and J+1 that was stored in the microprocessor 40 in the above step. The result is a corrected line J+1. This corrected line J+1 is fed back as an input to the microprocessor 40 by lead 51 and is stored therein, and is applied to display 32 or to some other electronics by lead 53. Line J+2 that was stored in third RAM 46 is read out by the microprocessor 40 on a PIXEL-by-PIXEL basis. Microprocessor 40 takes the gray level difference between corrected line J+1 and line J+2 on a PIXEL-to-PIXEL basis and then stores these differences in the first RAM 42. This sequence continues on through a selected number of lines until all selected adjacent scan lines are corrected by a mode of the differences in gray levels of the proceeding adjacent scan lines and is continuously repeated throughout each frame.

As it obvious from the above discussion, each of the techniques for calculating the values of histograms may be implemented in real time since the scan lines are stored on a line-to-line basis, rather than on an entire frame. The maximum time delay caused by either of the DC restorers, at most, the time to display one line.

We claim:

1. A technique for processing video detector signals in an AC coupled viewing system, the technique comprising:
    scanning a scene input signal off a scanner mirror over a detector array for generating detector output corresponding to the intensity of said scene input signal therefrom that are applied through capacitors to a plurality of preamplifiers and for simultaneously picking off a transducer output signal from said scanner mirror for applying synchronizing clockpulse timer signals to a controller of said viewing system;
    applying mathematical algorithms on peamplified detector output signals wherein said mathematical algorithms are applied to a selected number of adjacent scan lines;
    DC restoring said preamplified detector output signals that have mathematical algorithms applied thereto by continuously calculating histogram values to establish the difference in gray levels between said selected number of adjacent scan lines to establish a mode of the difference representing the maximum number of occurrences of the gray level differences on a PIXEL-by-PIXEL basis between at least two of said selected number of adjacent scan lines and adding said mode of the difference to adjacent scan lines to maintain a predominant DC component of said scene input signal for producing DC restored signals on a line-to-line basis;
    processing said DC restored signals into a visual image corresponding to the intensity of said scene input signal; and
    displaying said visual image on a display device.

2. A technique as set forth in claim 1 wherein the step of DC restoring comprises using charge coupled device analog processing means to establish said mode of the difference and adding said mode of the difference to adjacent scan lines for producing said DC restored signals on a line-to-line basis.

3. A technique as set forth in claim 2 wherein said DC restoring step more specifically comprises the steps of:
    sequentially multiplexing said selected number of adjacent scan lines of said preamplified detector output signals of said viewing system into first and second inputs of a first differential amplifier wherein multiplexer is controlled by synchronizing clockpulses from said controller that is applied thereto simultaneously with synchronizing clockpulses applied to said charge coupled device analog processing means;
    simultaneously taking the same scan line of said selected number of adjacent scan lines that was multiplexed into said second input of the first differential amplifier and storing into a line storage buffer of said charge coupled device analog processing means;

taking the differences of said first and second inputs of the adjacent scan lines of said preamplified detector output signals within first differential amplifier on a PIXEL-by-PIXEL basis;

continuously calculating histogram values of said differences of the preamplified detector output signals of said adjacent scan lines in said charge coupled device analog processing means comprised of a charge coupled device quantizer that accepts said detector output voltages and a charge coupled device sorter that has a plurality of charge channels that takes quantized signals and a charge coupled device serpentine delay line for moving the sorted quantized signals that determine the mode of differences and applying said mode of differences to one input of a second differential amplifier and simultaneously applying said adjacent scan line that was stored in said line storage buffer to another input of said second differential amplifier whereupon said second differential amplifier adds said mode of the differences to the second of each paid of adjacent lines to provide a corrected second line of each pair of adjacent scan lines; and storing said corrected second line of each pair of adjacent scan lines in a charge coupled device corrected line storage buffer for one scan line prior to the scan of another of said selected number of adjacent scan lines and then applying said corrected second line to said first input of said first differential amplifier while said another of said selected number of adjacent scan lines is simultaneously applied to said second input to said first differential amplifier and is stored into said charge coupled device line storage buffer to start calculation of the histogram values of these adjacent scan lines and continuously calculating histogram values for all adjacent scan lines throughout the entire frame.

4. A technique as set forth in claim 1 wherein the step of DC restoring comprises using microprocessing digital means to establish said mode of the difference and adding said mode of the difference to adjacent scan lines for producing said DC restored signals on a line-to-line basis.

5. A technique as set forth in claim 4 wherein said DC restoring step more specificallycomprises the steps of:

sequentially multiplexing said selected number of adjacent scan lines of said preamplified detector output signals of said viewing system into a microprocessor havingan internally programmed schedule for calculating histogram values of said adjacent scan lines multiplexed into said microprocessor wherein said schedule is controlled by a synchronizing clockwise timer signals from said controller; and microprocessing said selected number of adjacent scan lines by using first, second, and third random access memories wherein said microprocessor takes the mode of the differences between gray levels of said adjacent scan lines on a PIXEL-by-PIXEL basis and alternately stores in and reads out from said first random access memory these mode if differences between adjacent scan lines sequentially throughout each entire frame and wherein said microprocessor alternately stores and reads out the odd numbered scan lines in said second random access memory and alternately stores and reads out the even numbered scan lines in said third random access memory wherein each subsequent of said odd and even numbered scan lines is added with the preceding established mode of the differences to produce corrected scan lines that have a DC restored signal included therein for a processing by said processing step.

6. A technique as set forth in claim 5 wherein the step of microprocessing said selected number of adjacent scan lines more specifically comprises the following steps in which the microprocessor reads in a starting scan line and the first adjacent odd numbered scan line and takes the mode of the difference between said starting scan line and said first adjacent odd numbered scan line on a PIXEL-by-PXEL basis and stores said difference in said first random access memory and stores the first odd numbered scan line in said second random access memory and after a delay time between the scan of said first odd numbered scan line and the scan of a first adjacent even numbered scan line said mode of the difference between said starting scan line and said first adjacent odd numbered scan line is read out of said first random access memory by said microprocessor and is stored therein and said first adjacent even numbered scan line is read into said microprocessor and is stored in said third random access memory and after a delya time between the scan of the first even numbered scan line and the scan of the next sequentially adjacent odd numbered scan line said first odd numbered scan line that has been stored in said second random access memory is read out by said microprocessor in a PIXEL-by-PIXEL basis simultaneously as said next sequentially adjacent odd numbered scan line is read into said mircoprocessor and is stored in said second random access memory wherein said first odd numbered scan line is added in said microprocessor with said mode of difference between said starting scan line and said first adjacent odd numbered scan line to produce a corrected first odd numbered scan line that is processed by said processing step and is cycled back to an imput of said microprocessor wherein said first adjacent even numbered scan line that has been stored in said third random access memory is read out by said microprocessor on a PIXEL-by-PIXEL basis whereupon said microprocessor takes the mode of the difference of the gray levels between said corrected first odd numbered scan line and said first adjacent even numbered scan line on a PIXEL-by-PIXEL basis and then stores these differences in said first random access memory wherein all subsequent scan lines are corrected by a mode of the difference in gray levels of the preceeding two adjacent scan lines and is continuously repeated throughout each frame.

* * * * *